United States Patent Office 3,376,438
Patented Apr. 2, 1968

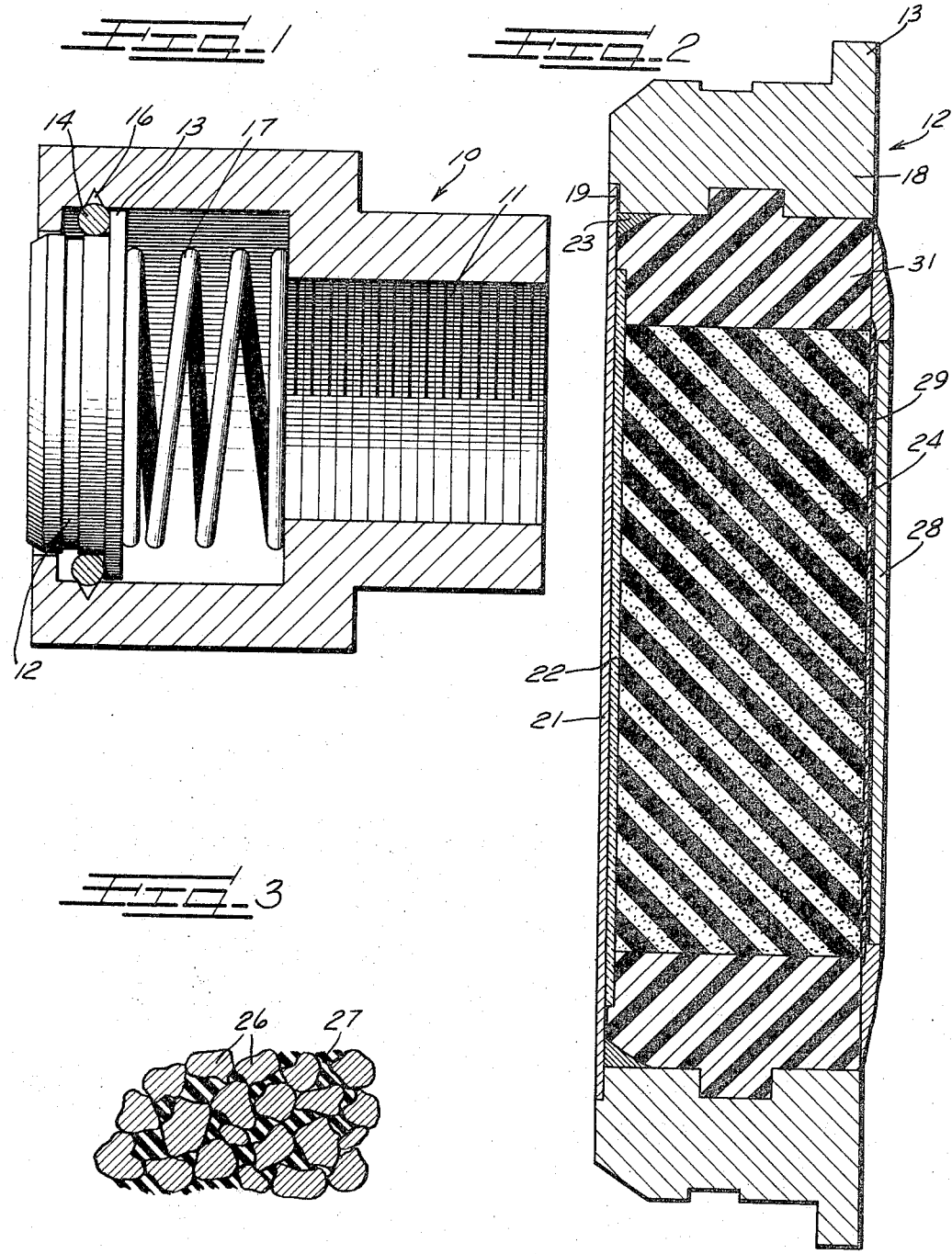

3,376,438
PIEZOELECTRIC ULTRASONIC TRANSDUCER
John R. Colbert, Wood Dale, Ill., assignor to Magnaflux Corporation, Chicago, Ill., a corporation of Delaware
Filed June 21, 1965, Ser. No. 465,385
9 Claims. (Cl. 310—8.2)

ABSTRACT OF THE DISCLOSURE

Ultrasonic transducer employing an improved damping means for the piezoelectric crystal, the damping means consisting of a self-sustaining sintered skeleton of metal particles impregnated with a sound insulator such as a silicone rubber.

---

The present invention relates to an improved ultrasonic transducer element of improved characteristics.

Ultrasonic transducers employing piezoelectric elements have numerous applications in industry and in medicine. One such field in the measurement of thickness of materials by a continuous propagation of ultrasonic waves therethrough, employing a resonance technique. This system involves noting the frequency of a signal which excites standing waves within the material being tested. When an oscillator is tuned to a frequency at which a standing wave is excited in the material under test, and a transducer is utilized to exchange electrical and sonic energy between the oscillator and the material respectively, a marked increase in loading upon the oscillator may be detected. The standing waves which result are excited in integrally related modes at ultrasonic frequencies, with the fundamental frequency being determined by the relationship:

$$f = \frac{V}{2T}$$

where $f$ is the fundamental frequency in cycles per second, $V$ is the propagational velocity of ultrasonic energy in the material in inches per second, and $T$ is the thickness of the material in inches.

The relation between the fundamental frequency $f$ and the higher order frequencies which excite higher order modes within the material is given by the relation:

$$f = \frac{f_n}{n}$$

where $f_n$ is the frequency of the harmonic and $n$ is the order of the harmonic.

It is convenient to define a quantity $t_n$ as the half wave length of the $n$th harmonic within the material. It can be shown that:

$$\frac{1}{T} = \frac{1/n}{t_n}$$

so that a determination of two or more successive harmonic half wave lengths will determine the thickness of the material.

Pulsed ultrasonic wave generating systems employing piezoelectric transducers find industrial use in flaw detection in metals. This type of system involves a pulse echo technique wherein the pulse generator and a receiver are energized alternately, with a suitable indicating means being provided to present a visual indication of the pulses reflected by the piece under test, to thereby enable the operator to determine the location and the depth of any flaws in the article.

In the operation of such transducers, it is important that the transducer elements operate with a minimum distortion and signal interference due to reflection of compressional waves from various surfaces of the transducer assembly. To that end, various types of acoustical impedance damping elements have been suggested for incorporation in such transducers. In some transducers of the past, it has been common practice to use a piece of cardboard as the primary damping means, the cardboard being surmounted by an electrically conductive contact button, and covered by a piece of aluminum foil. Such damping means were not entirely satisfactory because, first, they were difficult and expensive to manufacture, and second the performance characteristics of piezoelectric transducers manufactured in this manner were not consistent with each other.

With the foregoing in mind, an object of the present invention is to provide an improved ultrasonic generator embodying a piezoelectric transducer element having an improved damping means which is less expensive but has better operational characteristics than the damping means heretofore employed in such transducers.

Another object of the invention is to provide an improved acoustical impedance damping means which is capable of secure physical bonding to electrical contact elements, and thereby provide a good physical coupling to the piezoelectric element.

Still another object of the invention is to provide a damping means for a transducer element having a unidirectional piezoelectric element therein having completely reproducible performance characteristics.

Another object of the invention is to provide a combined crystal, wearplate, and backing assembly which substantially reduces the possibility of wearplate damage.

Still another object of the invention is to provide a transducer assembly having extended frequency response.

Still another object of the invention is to provide a transducer crystal assembly which is heavily loaded acoustically, and in which no loading pulse is developed at the resonant frequency.

In accordance with the present invention, I provide a damping member for piezoelectric crystals which consists of a naturally porous, self-sustaining skeleton of powdered metal impregnated with a sound insulator. This type of damping means is cheaper to produce than the cardboard type backing previously employed, and its performance characteristics are more reproducible than the cardboard type. Furthermore, it is easier to secure such damping elements to the remainder of the transducer assembly than is the case with the use of the cardboard-aluminum foil type of backing.

In the preferred form of the invention, the new backing is combined with a wearplate composed of alumina, which wearplate has been found to substantially resist gouging and other mechanical difficulties.

A further description of the present invention will be made in conjunction with the attached sheet of drawings in which:

FIGURE 1 is a cross-sectional view of a representative transducer assembly embodying the improvement of the present invention;

FIGURE 2 is an assembled view in cross-section of the crystal button assembly; and FIGURE 3 is a fragmentary, greatly enlarged view of the impregnated metal skelton which forms the backing element of the present invention.

As shown in the drawings:

In FIGURE 1, reference numeral 10 has been applied to a crystal holder assembly having an internally threaded bore 11 for mounting the holder assembly on a suitable device. A crystal button assembly 12 having an enlarged annular shoulder 13 is disposed within the holder 10, with a snap ring 14 being seated in a suitable recess 16 of the holder 10 to engage the shoulder 13 in abutting relation. A coil spring 17 urges the shoulder 13 forward against the snap ring 14.

The improved crystal button assembly of the present invention is best illustrated in FIGURE 2 of the drawings. As shown, the button assembly 12 consists of a casing 18 having an annular groove 19 formed in one face thereof, and a wearplate 21 seated against the base of the groove 19 and secured thereto by means of a suitable adhesive. The wearplate is preferably composed of alumina, a material which is harder than fused quartz, and which has been found to substantially reduce gouging damage in operation. The inner face of the wearplate 21 is provided with an extremely thin surface coating of a conductive metal such as a gold coating (not shown) which constitutes an electrode. Immediately behind the wearplate 21 is the crystal element 22 composed of lithium sulfate or the like. Electrical continuity between the casing 18 and the wearplate electrode 21 is provided by a deposit 23 of a conductive paint, such as silver paint.

The crystal element 22 is preferably secured to the wearplate assembly 21 by means of a suitable cement layer.

Disposed behind the crystal 22 is an improved backing 24 consisting of a naturally porous, self-sustaining skeleton of powdered metal impregnated with a sound insulator. Specifically, the damping backing 24 is preferably composed of stainless steel, although other electrically conductive metals can be used. In order to achieve the best results in accordance with the present invention, it is important to control the particle size of the powdered particles making up the sintered metal compact constituting the backing 24. I have found that for the frequencies used in ultrasonic thickness testers, the particle size should be in the range from about −20 to +200 mesh, or, stated another way, greater than about 74 microns and less than about 840 microns. The particles 26 of metal, illustrated in FIGURE 3, are sintered together by conventional techniques to form a "green" powdered metal compact which has a porosity normally in the range from 50 to 60%, with 55% being preferred. The sintering temperatures and conditions of sintering are those which are well known in the art. Typical sintering temperatures for metals range from about 65 to 80% of their melting points, expressed in degrees Kelvin.

The powdered metal compact consisting of the particles 26 held together by incipient fusion at the grain boundaries, is then impregnated with a sound insulator. For this purpose, I prefer to use an elastomeric sound insulator such as a rubber-like material, particularly a silicone type rubber. Typical silicone elastomers are prepared from a mixture of a dimethyl silicone polymer, an inorganic filler, and a vulcanizing agent. The silicone polymer is usually made by polymerization of very pure difunctional silicones in order to obtain a high molecular weight. For the purposes of the present invention, I prefer to use a room temperature vulcanizing silicone rubber as the sound insulating impregnant. One suitable commercially available material is the silicone rubber identified as "RTV 881," manufactured by The Dow Corning Corporation.

After formation of the self-sustaining compact, and sintering, the metal powder skeleton is lapped flat and parallel to within about 0.0002 inch. The lapping operation is carried out to achieve intimate contact between the backing and the remainder of the assembly, to assure uniform performance. Next, the compact is cleaned, preferably by ultrasonics. Then, the material is impregnated with the elastomeric sound insulator. The impregnation is important because it seals the backing against unwanted impregnation from acoustically conductive cements and potting compounds, and also allows the backing to be bonded to the remainder of the assembly. Without impregnation, the cement used to secure the backing to the remainder of the assembly would be sucked up into the interstices of the porous metal compact by capillary action, and a poor bond would result. Finally, the faces of the backing are lightly sanded with, for example, a 600 grit emery cloth to provide a cementable surface for receiving a cement film. As illustrated in FIGURE 3, the finished compact consists of the metal particles 26 sintered together and having the sound insulating elastomer 27 at least partly filling the voids in the originally porous skeleton.

An electrically conductive disk 28 is then secured to the opposite face of the backing 24 by means of a conductive layer 29 which may be an epoxy resin containing electrically conductive particles such as silver particles. The entire assembly is then placed in the casing 18, and a potting resin such as an epoxy resin 31 is poured in and set, to anchor the components within the casing.

Tests made on the improved transducer assembly of the present invention indicate that the improved transducers employing the sintered metal backings definitely have more uniform response across the face of the transducer than to other types of transducer assemblies. When used in pulse type ultrasonic testing, they require far less pressure by the operator to resolve near surface defects in a test piece due to the higher acoustic impedance on the crystal from the backing, thus requiring less from the test piece. This fact also makes it easier to resolve defects near the surface on rough surface parts, where the acoustic loading from the test piece is automatically reduced due to less contact area.

The new transducers definitely have a wide frequency response, as evident from their display characteristics. Furthermore, there is no loading pulse developed at the resonant frequency of the device. A very strong loading pulse appears with other types of transducers, which is one reason that they must be tuned outside of the band in which they are to operate. In the case of the instant transducers, the Q of the transducer is so low that it can have its resonant frequency within the operating frequency band with almost no evidence of its presence. This low Q is provided as a result of the loading of the backing and the wearplate. Since the crystal is so heavily loaded within the transducer, the percentage increase in loading from the test material is substantially less than with the transducers of the prior art, and hence the overcoupling effect is less.

From the foregoing, it will be understood that the transducer unit of the present invention provides substantial mechanical and electrical improvements over other types of crystal elements used for similar purposes. Largely, the improved results are attributable to the unique type of backing assembly which is employed, and to the combination of the backing with the improved wearplate assembly.

It should be evident that various modifications can be made to the described embodiments without departing from the scope of the present invention.

I claim as my invention:

1. An ultrasonic transducer comprising a piezoelectric crystal, and a damping member abutting said crystal, said damping member consisting of a naturally porous self-sustaining skeleton of powdered metal impregnated with a sound insulator.

2. An ultrasonic transducer comprising a piezoelectric crystal, and a damping member abutting said crystal, said damping member consisting of a naturally porous, self-sustaining skeleton of powdered metal impregnated with an elastomeric sound insulator.

3. An ultrasonic transducer comprising a piezoelectric crystal, and a damping member mechanically coupled to said crystal, said damping member consisting of a naturally porous self-sustaining skeleton of powdered metal impregnated with a silicone rubber.

4. An ultrasonic transducer comprising an open ended casing, a wearplate closing off one end of said casing, a flat piezoelectric crystal having one face secured in face-to-face contact with said wearplate, a disk secured to the opposite end of said casing, and a damping member interposed between said crystal and said disk, said damping member consisting of a naturally porous self-sustaining skeleton of powdered metal impregnated with a sound insulator, and a potting resin deposit anchoring said crystal within said casing.

5. The transducer of claim 4 in which said sound insulator is a silicone rubber.

6. The transducer of claim 4 in which said skeleton is composed of stainless steel.

7. The transducer of claim 4 in which the porosity of the skeleton before impregnation is in the range from about 50 to 60%.

8. The transducer of claim 4 in which the metal particles constituting said skeleton have a particle size of about −20 to about +200 mesh.

9. The transducer of claim 4 in which said wearplate is composed of alumina.

References Cited

UNITED STATES PATENTS

| | | | |
|---|---|---|---|
| 2,972,068 | 2/1961 | Howry | 310—8.2 |
| 3,166,730 | 1/1965 | Brown | 310—8.7 |
| 2,875,354 | 2/1959 | Harris | 310—8.2 |
| 2,458,288 | 1/1949 | Moriarty | 310—8.2 |
| 2,430,013 | 11/1947 | Hansell | 310—8.2 |
| 2,427,348 | 9/1947 | Bond | 310—8.2 |

MILTON O. HIRSHFIELD, *Primary Examiner.*

J. D. MILLER, *Examiner.*